(12) United States Patent
Fowler

(10) Patent No.: US 11,655,823 B2
(45) Date of Patent: May 23, 2023

(54) PREDICTIVE PUMP STATION AND PIPELINE ADVANCED CONTROL SYSTEM

(71) Applicant: Siemens Energy Global GmbH & Co. KG, Munich (DE)

(72) Inventor: Edward A. Fowler, Houston, TX (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 372 days.

(21) Appl. No.: 16/955,977

(22) PCT Filed: Dec. 20, 2017

(86) PCT No.: PCT/US2017/067621
§ 371 (c)(1),
(2) Date: Jun. 19, 2020

(87) PCT Pub. No.: WO2019/125436
PCT Pub. Date: Jun. 27, 2019

(65) Prior Publication Data
US 2021/0017999 A1 Jan. 21, 2021

(51) Int. Cl.
*G06F 30/20* (2020.01)
*F04D 15/00* (2006.01)
(Continued)

(52) U.S. Cl.
CPC .......... *F04D 15/0066* (2013.01); *F04D 1/06* (2013.01); *G05B 13/00* (2013.01); *G05B 17/00* (2013.01);
(Continued)

(58) Field of Classification Search
CPC ........ F04D 15/0066; F04D 1/06; G06F 30/20; G06F 2111/10; G05B 13/00; G05B 17/00;
(Continued)

(56) References Cited

U.S. PATENT DOCUMENTS

| 5,540,555 A * | 7/1996 | Corso ................. F04D 15/0066 137/565.33 |
| 8,717,434 B2 * | 5/2014 | Alphenaar ................ F17D 3/01 348/135 |
| 11,274,797 B1 * | 3/2022 | Zhu ....................... G01M 3/2815 |
| 2006/0009881 A1 * | 1/2006 | Ferber .................. G05D 7/0647 700/282 |
| 2008/0082215 A1 * | 4/2008 | McDowell ........... G05D 7/0688 700/282 |
| 2010/0299122 A1 * | 11/2010 | Golinveaux ........... G05B 17/02 703/9 |

(Continued)

FOREIGN PATENT DOCUMENTS

| WO | 2017023596 A1 | 2/2017 |
| WO | 2017184281 A1 | 10/2017 |

OTHER PUBLICATIONS

International Search Report and Written Opinion dated Nov. 6, 2018 corresponding to PCT Application No. PCT/US2017/067621 filed Dec. 20, 2017.

*Primary Examiner* — Kibrom K Gebresilassie

(57) ABSTRACT

A method and controller for operating a pumping station. The method includes receiving (1102), by at least one controller (910, 952), sensor data (712) of a first pumping station (900) corresponding to a liquid being transported from the first pumping station (900). The method includes predicting (1104) arrival of the liquid, by the at least one controller (910, 952), at a second pumping station (900). The method includes executing (1106) one or more pump models (720), by the at least one controller (910, 952), according to the sensor data (712) to determine an optimal pumping configuration. The method includes operating (1108) one more pumps of the second pumping station (900), by the at least one controller (910, 952), according to the optimal pumping configuration.

14 Claims, 11 Drawing Sheets

(51) Int. Cl.
  *F04D 1/06*        (2006.01)
  *G05B 13/00*      (2006.01)
  *G05B 17/00*      (2006.01)
  *G06F 111/10*    (2020.01)

(52) U.S. Cl.
  CPC ...... *G06F 30/20* (2020.01); *F04B 2203/0209* (2013.01); *F05D 2260/81* (2013.01); *F05D 2270/335* (2013.01); *F05D 2270/44* (2013.01); *G06F 2111/10* (2020.01)

(58) Field of Classification Search
  CPC ......... F04B 2203/0209; F05D 2260/81; F05D 2270/335; F05D 2270/44
  See application file for complete search history.

(56) References Cited

U.S. PATENT DOCUMENTS

| | | | |
|---|---|---|---|
| 2012/0185220 A1* | 7/2012 | Shippen | G06F 30/20 703/2 |
| 2013/0103370 A1* | 4/2013 | Barley | G06F 17/10 703/2 |
| 2014/0052421 A1* | 2/2014 | Allen | G06F 30/20 703/2 |
| 2014/0214880 A1* | 7/2014 | Chi | G06F 16/2453 707/768 |
| 2016/0341191 A1* | 11/2016 | Boeing | F04B 17/03 |
| 2016/0378123 A1* | 12/2016 | Montestruque | G05B 15/02 700/282 |
| 2017/0097647 A1* | 4/2017 | Lunani | G05B 15/02 |
| 2018/0202612 A1* | 7/2018 | Simpson | G01B 13/06 |
| 2019/0187640 A1 | 6/2019 | Fowler | |

\* cited by examiner

PREDICTIVE PUMP STATION AND PIPELINE ADVANCED CONTROL SYSTEM

CROSS-REFERENCE TO OTHER APPLICATION

This application shares some subject matter with commonly-assigned, concurrently filed U.S. patent application Ser. No. 15/849,029, U.S. Pat. No. 10,921,765, for "Digital Twin of Centrifugal Pump in Pumping Systems", which is hereby incorporated by reference.

TECHNICAL FIELD

The present disclosure is directed, in general, to liquid pumping systems, including but not limited oil and gas and multiphasic pipeline pumping systems.

BACKGROUND OF THE DISCLOSURE

It can be difficult and expensive to operate pumping systems for transport of liquids of varying viscosities and other characteristics. Improved systems are desirable.

SUMMARY OF THE DISCLOSURE

Various disclosed embodiments include a method and controller for operating a pumping station. The method includes receiving, by at least one controller, sensor data of a first pumping station corresponding to a liquid being transported from the first pumping station. The method includes predicting arrival of the liquid, by the at least one controller, at a second pumping station. The method includes executing one or more pump models, by the at least one controller, according to the sensor data to determine an optimal pumping configuration. The method includes operating one more pumps of the second pumping station, by the at least one controller, according to the optimal pumping configuration.

In various embodiments, the at least one controller is a controller of a station control system of the second pumping station. In various embodiments, the at least one controller is a controller of a control system that controls a plurality of pumping stations. In various embodiments, the sensor data includes one or more of flow rate data, density data, viscosity data, or pressure data. In various embodiments, the arrival of the second liquid is determined according to one or more of the sensor data, a pipeline model, and a timestamp. In various embodiments, each of the one or more pump models is a digital twin model of a corresponding pump of the second pumping station. In various embodiments, the optimal pumping configuration is a configuration that uses the least energy to pump the liquid out of the second pumping station to a downstream pumping station at a given discharge pressure. In various embodiments, the method is performed repeatedly or continuously. In various embodiments, the sensor data includes a timestamp. In various embodiments, the arrival is based at least on a pipeline model that is one of a steady-state model or a transient hydraulic model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
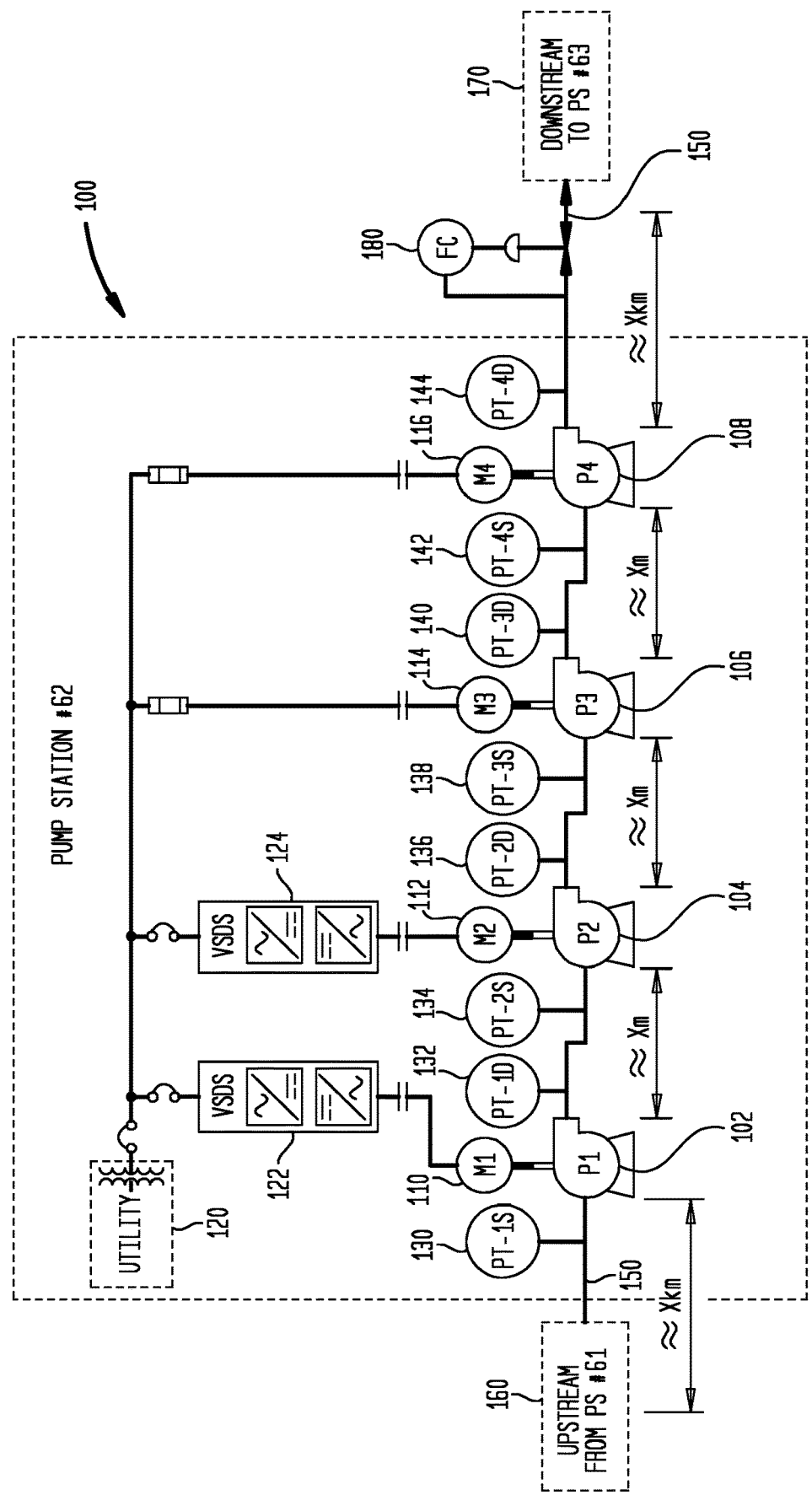
FIG. 1 illustrates an example pump station constructed in accordance with an exemplary embodiment of the present invention.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A large-scale liquid pumping system, such as an oil pipeline, typically will have a series of geographically-separated pumping stations along the pipeline that function to pump the liquid and keep it in transport between source and destination. The liquid being transferred may vary in type and characteristic over time. For example, the same pipeline is used to carry crude oil of different assays, such as crude oil that is heavy, light, sweet, or sour, as those terms are used in the field, or different oils such as diluted bitumen oil, or synthetic crude oil. Each type of oil or other liquid may have different viscosity, density, or other characteristics. Typical oil pipelines transport batches of different types of oil. Batches can be of different products and of different grades of the same product. Batch changes can occur frequently, as often as several times per day.

The pressure needed to pump the liquid changes based on the type or characteristics of the liquid, as does the energy needed to operate the pumps to achieve effective transport. In a pumping station, there can be multiple pumps. Some of those pumps may always operate at full power/capacity, while other variable-speed pumps are varied according to the liquid characteristics to ensure proper transport. In any of the pumps, the original nominal performance of the pump, such as specified by the manufacturer's specifications, can change with the liquids properties and degrade over time, so that operation based only on the original specifications leads to less-than-optimal results.

Manufacture pump curves typically describe performance for just water. They may or may not include curves for a viscous liquid. The ANSI/Hydraulic Institute standard 9.6.7-2015 "Rotodynamic Pumps—Guideline for Effect of Liquid Viscosity on Performance" provides methods and equations on how to adjust the water curves to determine a pump will perform for specific densities and viscosities other than water. When the pump wears and its performance degrades due to such things as cavitation, the ANSI/HI methods no longer work because the manufacturer curves reflect the performance of a brand new pump, not one that has worn out and only has, for example, 80% of its impeller left.

Disclosed embodiments implement a real-time simulation and modeling of pump operation and characteristics based on actual performance, so that the operating parameters of the pumps can be adjusted according to the current liquid characteristics and the current operating characteristics of the pump. In various embodiments, the modeling is performed by a programmable logic controller (PLC), avoiding the need for a large-scale simulation system. Disclosed embodiments can be applied to pump stations and pipelines that transport any "produced products" such as various grades of gasoline, jet fuel, diesel, etc., and are not limited to crude oil. Disclosed embodiments can be applied to any systems, and in particular those in which the liquid has properties that can change over time.

Currently, there is no effective means for dynamically simulating a centrifugal pump whose performance no longer follows manufacturer specification curves, such as by using a programmable logic controller at pump stations. There is no rapidly-deployable, low-cost real-time generic centrifugal pump simulation and parameter calculations for variable speed, variable viscosity, and variable density pumping applications where pump performance no longer follows manufacturer specification curves suitable for integration with standard automation solutions. There are processes for determining for pump pressure (pump "head") as a function of variables such as pump speed and pump flow. There is no centrifugal pump simulator "program block" that can model any centrifugal pump for viscous liquids, such as simulating pump head as a function of pump speed and flow.

FIG. 1 illustrates an example pump station constructed in accordance with an exemplary embodiment of the present invention.

The pump station 100 as illustrated in FIG. 1 models a four-pump-in-series-station with pumps 102, 104, 106, and 108, also labelled as P1, P2, P3, and P4, for transporting a liquid, for example oil, along pipeline 150. Many other media or liquids can be transported in the pipeline 150. Each pump 102, 104, 106, 108 is driven by an electric motor, which are for example induction motors. Pump 102 is driven by pump motor 110, also labelled M1, pump 104 is driven by pump motor 112 (M2), pump 106 is driven by pump motor 114 (M3), and pump 108 is driven by pump motor 116 (M4). For example, electrical power is supplied by power supply 120, also referred to as utility. Likewise, power supply can be by generator. If required, electrical transformers transform incoming voltage to appropriate levels for the pump motors 110, 112, 114, 116.

Pumps 102, 104, 106, 108 are each configured as a centrifugal pump. In this exemplary embodiment, the power for driving the pumps 102, 104, 106, 108 is provided directly by the electric pump motors 110, 112, 114, 116.

Pumps 102, 104 are powered each by a variable speed drive, also referred to as Variable Speed Drive System (VSDS). Pump 102 is powered by VSDS 122, and pump 104 is powered by VSDS 124. The variable speed drives 122, 124 are used to control speed and torque of pump motors 110, 112. In the exemplary embodiment according to FIG. 1, each VSDS 122, 124 is operated with a fixed speed set point. Pumps 106, 108 are operated at a constant speed powered from the utility 120. Optionally, the pump station 100 can be equipped with a flow controller 180.

Pumps 102 (P1) and 104 (P2), which are powered by VSDS 122 and 124, can be discharge pressure controlled using speeds of the motors 110 (M1) and 112 (M2). Thus, each pump 102, 104 comprises pressure sensors/transmitters 130, 132, 134, 136. Pressure transmitters 130, 132 monitor pressure head of pump 102, wherein pressure transmitter 130, also labelled as PT-1S, is arranged upstream of pump 102 and pressure transmitter 132, also labelled PT-1D, is arranged downstream of pump 102. Transmitter 132 is operably connected to VSDS 122 in order to control the discharge pressure of pump 102 using the speed of motor 110. As FIG. 1 shows, each further pump 104, 106, 108 comprises at least two pressure transmitters 134 (PT-25), 136 (PT-2D), 138 (PT-35), 140 (PT-3D), 142 (PT-45), 144 (PT-4D), wherein one pressure transmitter is arranged upstream of the pumps 104, 106, 108 and one pressure transmitter is arranged downstream of the pumps 104, 106, 108. As described below, other sensors/transmitters can be associated with one or more of the pumps.

The four centrifugal pumps 102, 104, 106 and 108 of pump station 100 are arranged in series. One of ordinary skill in the art appreciates that pump station 100 can comprise more or less than four pumps, for example only one pump or ten pumps. When pump station 100 comprises more than one pump, the pumps can be arranged in series and/or in parallel and/or a combination of both.

The pump station 100 further comprises field devices to measure and monitor relevant data and manipulate operation. Such field devices comprise for example flow, pressure and temperature gauges, sensors, and transmitters. Pump station 100 can comprise pressure and temperature gauges and transmitters installed along the pipeline 150 on specific locations. A supervisory control and data acquisition system (SCADA) system, for example at a main control room, receives all the field data and presents the data to pipeline operators through a set of screens or other type of human-machine-interface, displaying the operational conditions of the pipeline. The operator can monitor the hydraulic conditions of the line, as well as send operational commands (open/close valves, turn on/off compressors or pumps, change set points, etc.) through the SCADA system to the field. Exemplary embodiments of the present invention integrate into such an operational environment, and, as described herein can be implemented using a PLC performing processes as disclosed herein.

The pump station 100 is labelled as pump station #62 and is part of a pump system. A pump system can comprise one ore pump stations, such as for example pump station 100 as illustrated in FIG. 1. As FIG. 1 shows, pump station 100 (#62) is connected between pump station 160 (#61) and pump station 170 (#63), wherein pump station 160 is located upstream of pump station 100 and pump station 170 is located downstream of pump station 100. Between the pump stations 100, 160 and 170 are distances of many kilometers. The distances between individual pump stations (X km) can vary, for example according to specific regional requirements. According to selected distances between pump stations, the number of individual pumps may need to be adjusted. For example, the longer the distance between pump stations, the more pumps at the pump station may be required in order to provide flow. Multiple pump stations, as for example pump stations 100, 160, 170, of a pump system can be arranged in series or parallel or in a combination of both. The pump stations 100, 160, 170 as schematically shown in FIG. 1 are arranged in series. Each pump of a pump system and/or each pump 102, 104, 106, 108 of a pump station such as pump station 100 can be either driven by a VSDS or can be powered directly by the utility 120, also referred to as direct online type (DOL). Each of the pumps 102, 104, 106, 108 can be operated on/off. When DOL operation of pumps 102, 104, 106, 108 is required, pumps 102, 104, 106, 108 are typically started using VSDs 122 and/or 124 to accelerate a pump to rated speed then transfer power to utility 120 after which VSDs 122 and/or 124 is/are disconnected from the pump and made available for use by the other pumps. Alternately, pumps 102, 104, 106, 108 can also be "across the line" started, with no accelerating with the VSD. Distances between individual pumps 102, 104, 106, 108 (X m) can be equal or can be different.

Disclosed embodiments can manage variable-speed pumps, such as pumps 102 (P1) and 104 (P2), which are powered by VSDS 122 and 124, using processes that implement equations for pump properties such as head:

$$\text{head} = \left(\frac{\text{speed}}{\text{speed}_{BEP}}\right)^2 f\left(\left(\frac{\text{speed}_{BEP}}{\text{speed}}\right)\text{flow}\right)$$

And speed as a function of head and flow speed=f(head, flow)

And flow as a function of speed and head flow=f(speed, head) and other functions.

In this equation, $\text{speed}_{BEP}$ is the reference speed constant at the pump's Best Efficiency Point and $$f\left(\left(\frac{\text{speed}_{BEP}}{\text{speed}}\right)\text{flow}\right)$$

is either a polynomial or cubic spline (or other suitable curve fit equation) whose coefficients are calculated by a system as disclosed herein based upon parameterized head-flow point pairs taken from the pump manufacturer's specification curves. These equations are modeled by the processes described in FIGS. 4, 5, and 6, and effectively simulates pump properties such as head for liquids such as water, and correction factors can be used to correct for viscous liquids.

Figure 2:
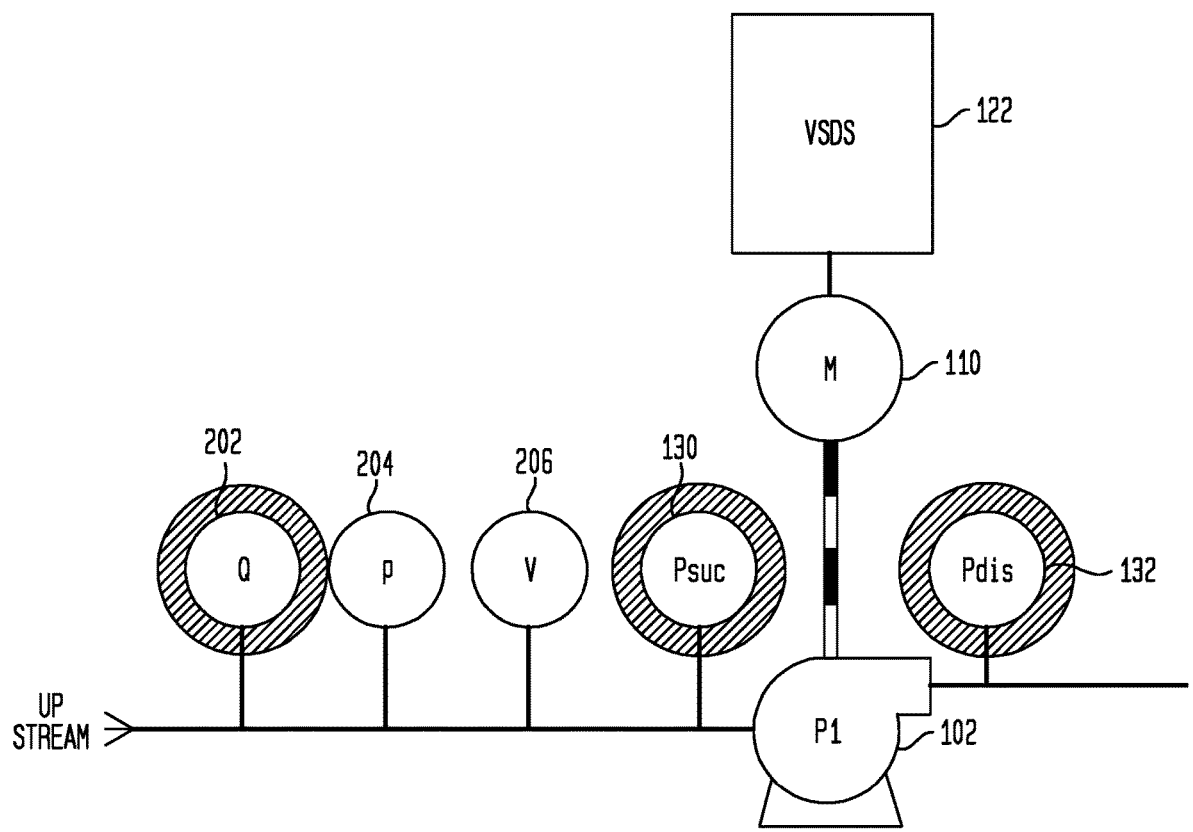
FIG. 2 illustrates additional elements associated with a pump in accordance with disclosed embodiments.

FIG. 2 illustrates additional elements associated with pumps 102 (P1), which is powered by VSDS 122 and motor 110 in accordance with disclosed embodiments. Note that this example of pump 102 and associated elements can be implemented using any or all of the pumps at a given station.

As above, pressure transmitters 130, 132 monitor pressure head of pump 102, wherein pressure transmitter 130, also labelled as $P_{suc}$, is arranged upstream of pump 102 and pressure transmitter 132, also labelled $P_{dis}$, is arranged downstream of pump 102. Additional sensor/transmitters, in accordance with disclosed embodiments, include a flow rate (Q) sensor 202, a density (ρ) sensor 204, and a viscosity (v) sensor 206, and other relevant sensors such as temperature sensors and others. Each of these factors are read repeatedly or continually to determine the characteristics of the liquid and its flow through the pump. These and other variables are used to analyze pump power and performance:

Ph: Hydraulic power of the pump (kW).
Ps: Shaft power of the pump (kW).
Pm: Required power to the Motor (kW).
Q, q: Volumetric flow of liquid through the pump (m³/h).
P: Density of the liquid being pumped (kg/m³).
g: Gravity (9.81 m/s²).
H, h: Head produced by the pump (m).
Pd: Differential pressure across the pump (kPa).
$n_p$: Pump efficiency (%).
$n_m$: Motor efficiency (%).
n: Rotational speed (RPM).

The efficiency of a pump can be calculated as $$\text{Efficiency} = \frac{\text{Flow(Discharge Pressure} - \text{Suction Pressure)}}{\text{Applied Shaft Power}} \text{ or}$$

$$\eta_p = \frac{Q(P_{dis} - P_{suc})}{P_s}$$

Efficiency is a function of flow rate, itself a function of RPM and pipeline system curves, and of viscosity.

Disclosed embodiments provide a "digital twin" of a pump (or twins of multiple pumps) that models the performance of the physical pump in a simulator or by a PLC. The digital twin can be used, in particular, to model the pump based on the actual performance characteristics of the pump, in combination with the characteristics of the liquid, to analyze and improve performance of the physical pump. The digital twin, and the system or device by which it is implemented, is generically referred to as the "system" herein.

Figure 3:
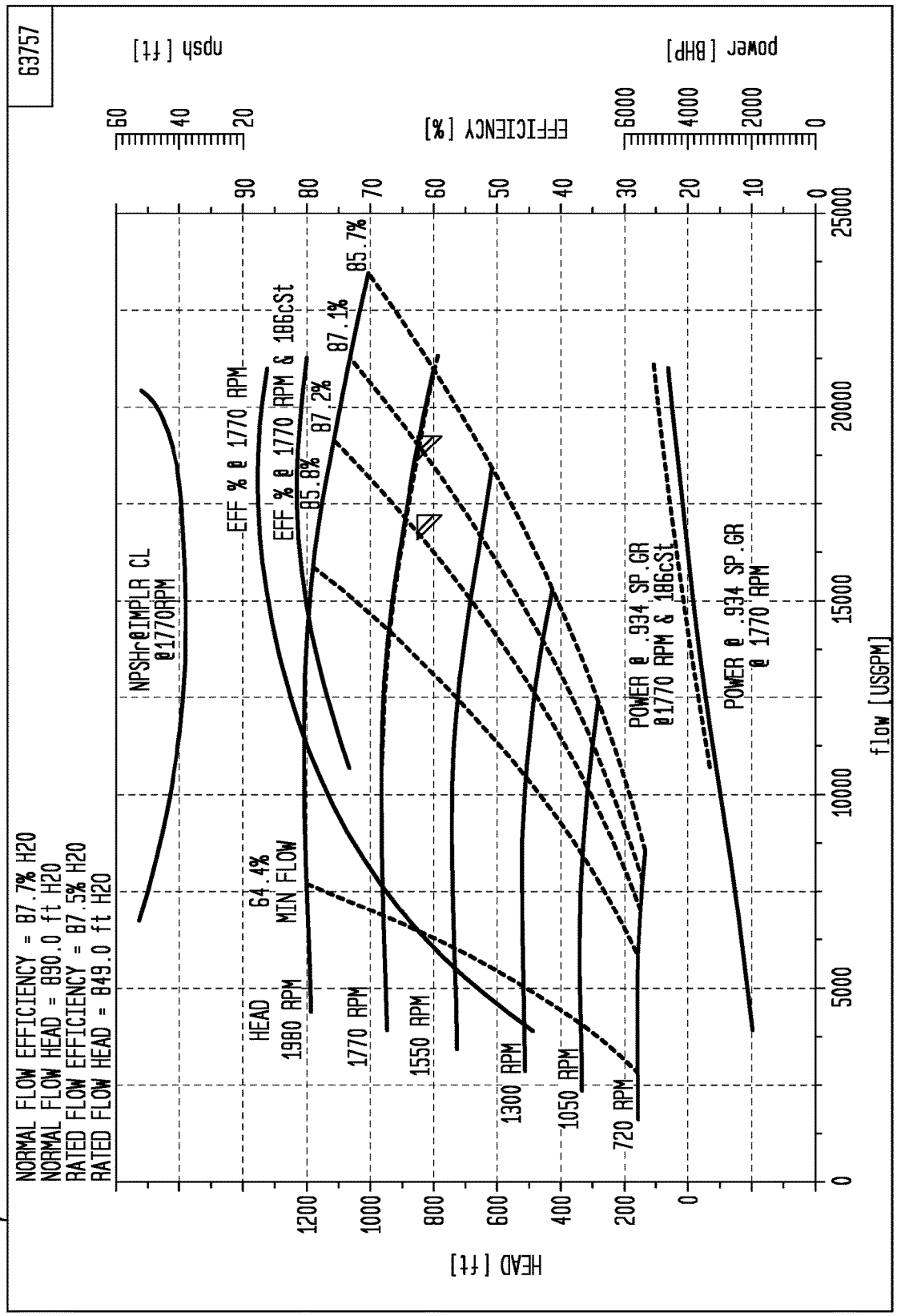
FIG. 3 illustrates an example of a manufacture's pump curves from a pump manufacturer's specifications.

FIG. 3 illustrates an example of a manufacture's pump curves from a pump manufacturer's specifications. This figure shows head-flow for various RPM speeds, and pump efficiency-flow. Pump curves such as those shown in this example are used as a basis determining pump manufacturer characteristics as disclosed herein.

This particular example of manufacturer's curves correspond to a Sulzer pump model HSB 20×24×31 AZ Single Stage, curve number 63757, Revision A, pump number 359343, with impeller pattern 2013HSB-06 staggered.

Pump curves such as those shown in FIG. 3 are used to perform curve-fitting to model the pump. For example, a head-flow curve at 1770 RPM is used to extract the head-flow ordered pairs used by the algorithms to calculate coefficients for the curve fitting equations (but of course other curves could be used). Note that as pump speed is increased/decreased the curve maintains its general shape due the centrifugal pump Affinity Laws and shift up-and-right and down-and-left respectively. The performance curve is can be represented as a 3-dimensional surface.

Figure 4:
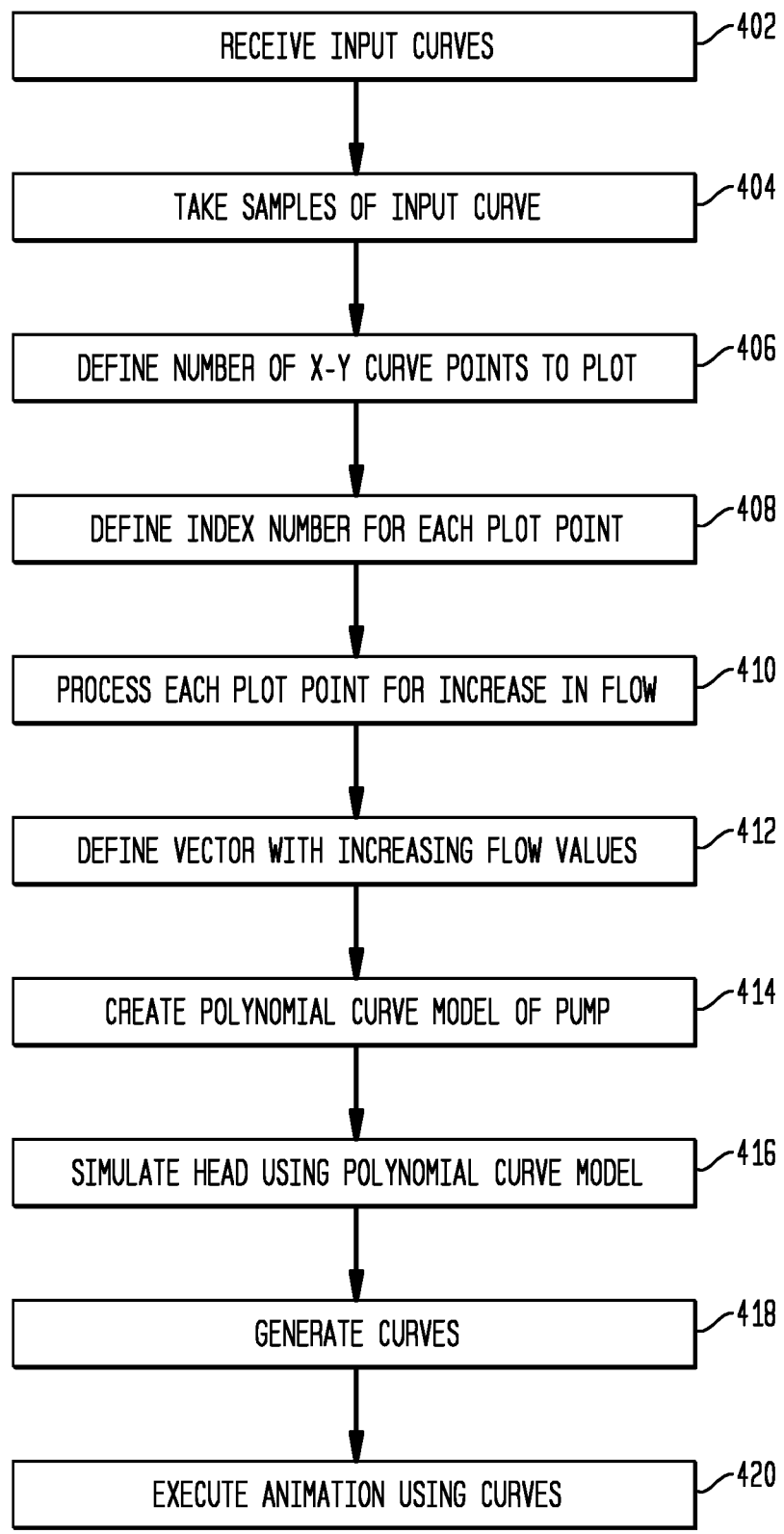
FIG. 4 illustrates a process as disclosed herein to create head-flow models to fit the performance curves.

FIG. 4 illustrates a process as disclosed herein to create head-flow models to fit the performance curves. One curve fitting approach is a cubic-spline function and the other is a $3^{rd}$ order polynomial. Both equations can be used for comparison purposes. While the cubic spline results are more accurate than the polynomial, the difference in values is negligible for the application and implementation of the polynomial is less complex and requires less programming. While specific examples below describe polynomial curve fitting, other curve-fitting approaches can be used within the scope of disclosed embodiments to find one or more curve-fitting equations. Similarly, the specific equations below describe one exemplary implementation, but other curve-fitting techniques and equations can be used.

The system receives an input curve (402). This can be one or more curves as illustrated in FIG. 3 or other curves that specify pump performance.

The system can use centrifugal pump affinity laws for changes in speed, where:

$$\frac{Q_2}{Q_1} = \frac{N_2}{N_1}$$

$$\frac{H_2}{H_1} = \left(\frac{N_2}{N_1}\right)^2$$

$$\frac{H_2}{H_1} = \left(\frac{Q_2}{Q_1}\right)^2$$

The system can take samples of a selected input curve (in this example, the 1770 RPM reference curve) for both flow (Q) and head (H) (404), for example:

$$Q_{splineSamples} := \begin{pmatrix} 3875 \\ 5000 \\ 7500 \\ 10000 \\ 12500 \\ 15000 \\ 17500 \\ 20000 \\ 21575 \end{pmatrix}$$

$$H_{splineSamples} := \begin{pmatrix} 878 \\ 882.3 \\ 894 \\ 900 \\ 890 \\ 870 \\ 835 \\ 780 \\ 740 \end{pmatrix}$$

$$Q_{cubicSamples} := \begin{pmatrix} 3875 \\ 10000 \\ 15000 \\ 21575 \end{pmatrix}$$

$$H_{cubicSamples} := \begin{pmatrix} 878 \\ 900 \\ 870 \\ 740 \end{pmatrix}$$

The system can then define the number of head-flow points, or other X-Y points on the curve, to plot for the cubic spline and polynomial simulated pumps (406). Disclosed embodiments are not limited to the head-flow curve, but can use any one or more input curves, each of which can be functions of one or many variables.

The system can set N:=20, for example, as the number of simulated pump performance curve points to plot.

The system can define an index number for each of the plot points, for example as n:=0 . . . (N-1) (408).

The system can process each increase in flow (increment) from one plot point to the next, such as (410):

$$q_{Inc} := \frac{\max(Q_{splineSamples}) - \min(Q_{splineSamples})}{N - 1}$$

The system can then create the curve model of the pump (412). In some embodiments, this is a polynomial curve model, but other curve models and curve-fitting techniques can be used. This can use cubic polynomial coefficients, such as:

$$cubic_{coef} :=$$

$$\begin{bmatrix} (Q_{cubicSamples_0})^3 & (Q_{cubicSamples_0})^2 & (Q_{cubicSamples_0})^1 \\ (Q_{cubicSamples_1})^3 & (Q_{cubicSamples_1})^2 & (Q_{cubicSamples_1})^1 \\ (Q_{cubicSamples_2})^3 & (Q_{cubicSamples_2})^2 & (Q_{cubicSamples_2})^1 \\ (Q_{cubicSamples_3})^3 & (Q_{cubicSamples_3})^2 & (Q_{cubicSamples_3})^1 \end{bmatrix}^{-1} \cdot H_{cubicSamples}$$

Exemplary cubic coefficients can be:

$$cubic_{coef} = \begin{pmatrix} -18.508825888303 \times 10^{-12} \\ -327.745224133137 \times 10^{-9} \\ 10.985322900272 \times 10^{-3} \\ 841.430119298895 \times 10^{0} \end{pmatrix}$$

The system can simulate the head using the curve model (414), such as:

$$H_{poly_n} := cubic_{coef_0} \cdot (Q_n)^3 + cubic_{coef_1} \cdot (Q_n)^2 + cubic_{coef_2} \cdot (Q_n) + cubic_{coef_3}$$

The system can use the affinity laws to generate head-flow curves (416), replicating those as shown in FIG. 3, or to produce head-flow curves according to sampled data, such as:

$$RPM := \begin{pmatrix} 1980 \\ 1550 \\ 1300 \\ 1050 \\ 720 \end{pmatrix}$$

$$q_{ref} := Q_{splineSamples_7}$$

$$h_{ref} := H_{splineSamples_7}$$

$$H_{RPM_{s,n}} := h_n(rpm_{ref}, RPM_s, Hcs_n)$$

This step can include defining the index number for each of the RPM values, such as:

$$s := 0 \ldots \text{length}(RPM) - 1$$

This step can include defining a speed-flow matrix after applying affinity laws, such as:

$$Q_{RPM_{s,n}} := q(\text{rpm}_{ref}, RPM_s, Q_n)$$

This step can include defining a head-flow matrix after applying affinity laws, such as:

$$H_{RPM_{s,n}} := q(\text{rpm}_{ref}, RPM_s Hcs_n)$$

The system can validate the generated curves by comparing them to the original curves, such as those shown in FIG. 3. Any of the curves, for example for different RPMs, can be generated and validated.

The simulated pump equations effectively allow the digital twin of the pump to be executed, where head is a function of flow and speed. The solution for created h(q,n) is elegant. The affinity laws state that flow changes proportionally to changes in speed; flow decrease with decreasing speed and increase with increasing speed. The affinity laws also state that head changes proportionally to the square of the speed ratio. Creating h(q,n) is performed by scaling the flow variable with the inverse of the speed ratio and scaling the result with the square of the speed ratio, such as:

$$\text{flow} := 15000 \quad \text{spd} := 1300$$

$$head_{cs} :=$$

$$\left(\frac{spd}{RPM}\right)^2 \cdot interp\left[cubicSpline, Q_{splineSamples}, H_{splineSamples}, \left(\frac{RPM}{spd}\right) \cdot \text{flow}\right]$$

$$headpoly(\text{flow}, spd) := \left(\frac{spd}{RPM}\right)^2 \cdot \begin{bmatrix} cubic_{coef_0} \cdot \left[\left(\frac{RPM}{spd}\right) \cdot \text{flow}\right]^3 + \\ cubic_{coef_1} \cdot \left[\left(\frac{RPM}{spd}\right) \cdot \text{flow}\right]^2 + \\ cubic_{coef_2} \cdot \left[\left(\frac{RPM}{spd}\right) \cdot \text{flow}\right] + cubic_{coef_3} \end{bmatrix}$$

In various embodiments, the "digital twin" simulation can be implemented as a function block programmed in Structured Control Language (SCL), and can be implemented on a PLC, though other languages and hardware implementations can be used in other embodiments. Such a function block is portable and easily modified as required to run on different CPU families and used in different programming environments.

During initialization all outputs can be defaulted and the curve fitting polynomial (or cubic spline) coefficients can be calculated for the head vs flow curve, the efficiency vs flow curve, the net positive suction head curve, and the brake horse power curve.

Because the processes for calculating output values are computationally efficient, the function can be called every controller cycle or as rapidly or slowly as the application needs, such as in a cyclic interrupt block. The function can also be executed immediately (such as an interrupt) should process conditions (such as a fault) dictate immediate execution.

The system can animate changing flow and speed values using the head-flow curves (418). Such an animation can show the head as a function of flow and speed. Minimum and maximum flow values from each speed are taken from the reference samples at a selected RPM.

The system can then operate the pump(s) according to the model(s) (420).

To create actual performance curves according to sensor data, the system can use a process as described above. In addition, the system can collect the actual process data from the sensors describes above and create multiple three-dimensional (3D) matrices, one for train power, one for train efficiency and one for train head. The system can do so for both DOL pumps and VSD pumps.

Figure 5:
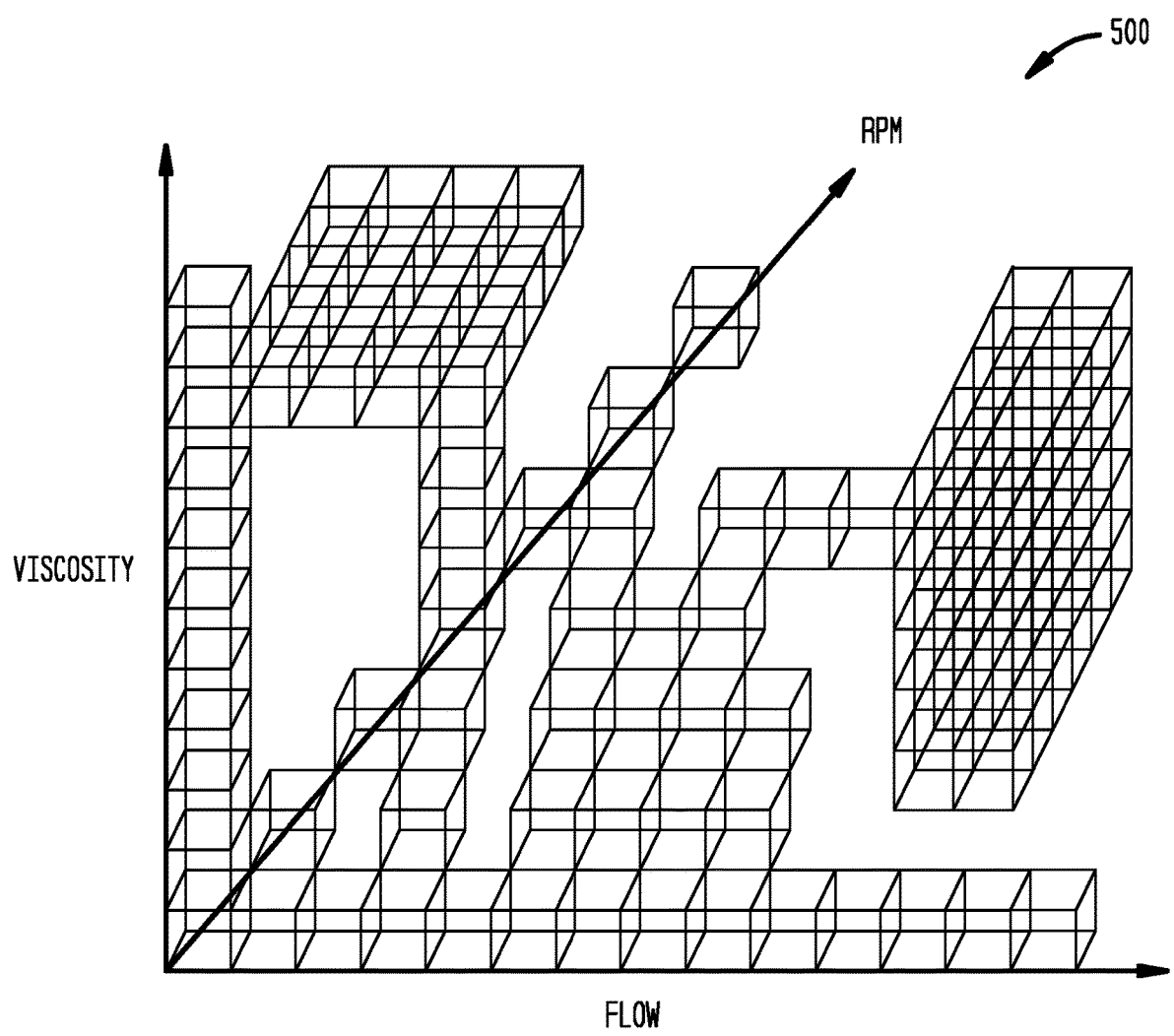
FIG. 5 illustrates an example of a 3D matrix in accordance with disclosed embodiments.

FIG. 5 illustrates an example of such a 3D matrix 500.

Figure 6:
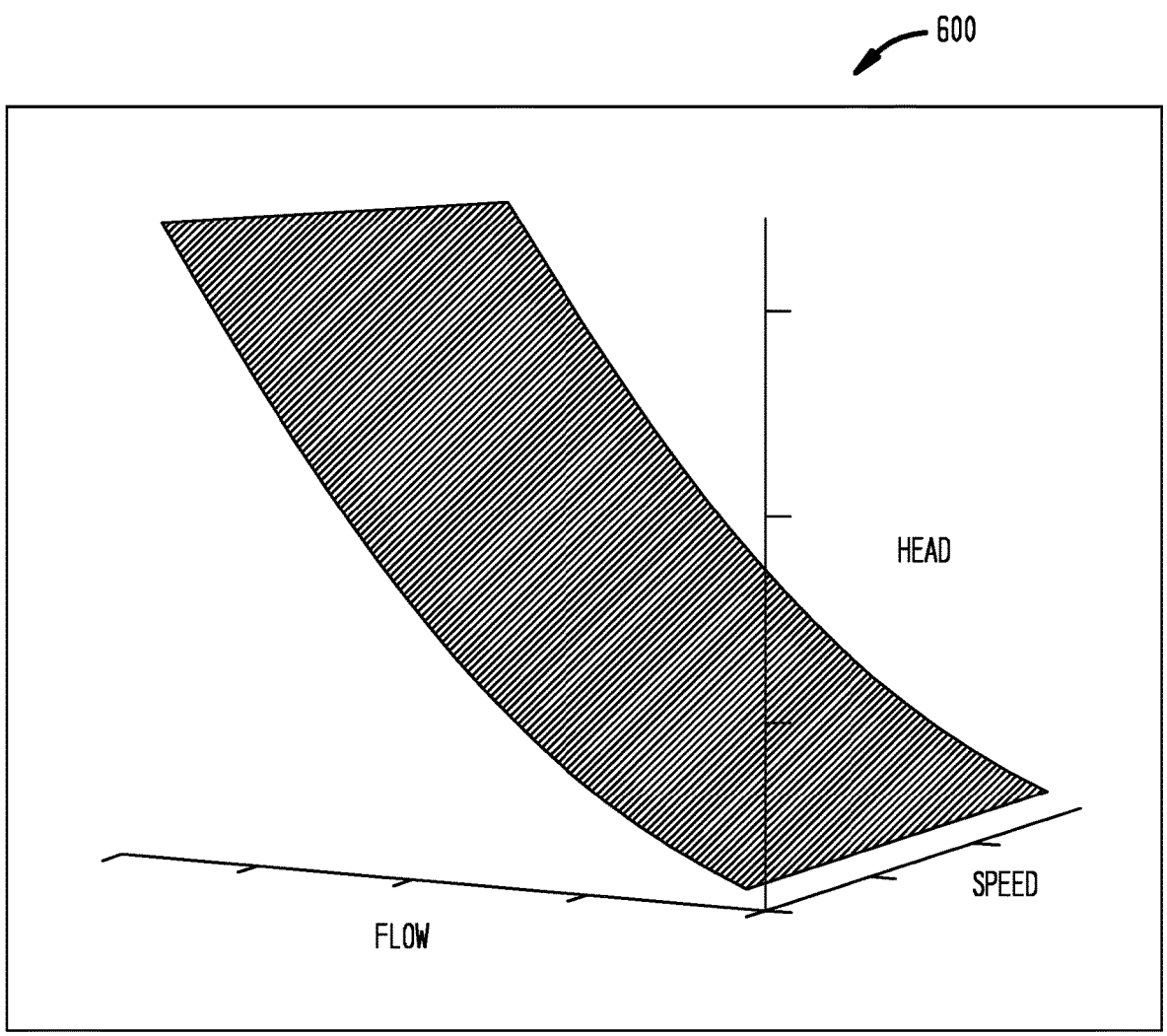
FIG. 6 illustrates a 3D graph in accordance with disclosed embodiments.

The system can continue to collect sensor data during operation to create updated surface plots of flow, head, and speed. FIG. 6 illustrates an example of such a 3D graph 600.

To create revised manufacturer performance curves according to sensor data, the system can use a process similar to those as described above. The system can then apply the ANSI/Hydraulic Institute 9.6.7-2015 equations and methodology in a reverse fashion, in combination with the Affinity Laws as viscous-to-water normalizing equations using the actual sensor data to adjust the parametric equations, as described above, of the manufacture curves. Similar techniques can be used to reproduce the original manufacturer performance curves should they be unavailable, and can be used to reproduce any curves related to the pump operation.

Figure 7:
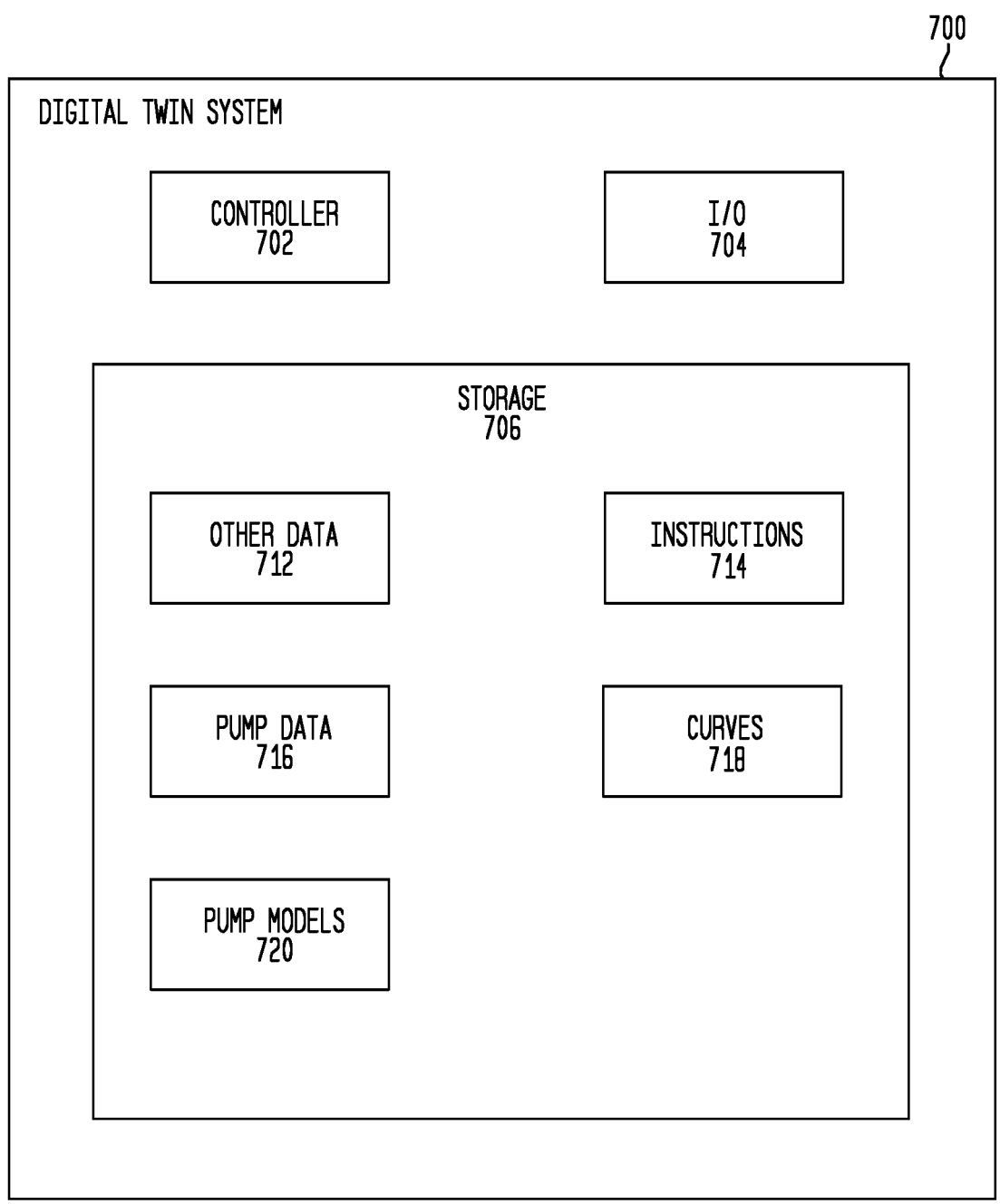
FIG. 7 illustrates a block diagram of a digital twin system in accordance with disclosed embodiments.

FIG. 7 illustrates a block diagram of a digital twin system 700 in accordance with disclosed embodiments. In specific embodiments, the digital twin system 700 is implemented using one or more PLCs. In other embodiments, the digital twin system 700 can be implemented as a cloud application and results sent back to the pump station. Similarly, calculations and models performed at the pump station can be sent to cloud applications for further optimization calculations.

Digital twin system 700 includes a controller 702 and an input/output (I/O) unit 704. I/O unit 704 can include any necessary hardware to communicate with other devices, including physical connections, network interfaces (wired and/or wireless), display outputs, HMI inputs and outputs, and other devices, or appropriate connections to communicate with any such external devices to perform processes as disclosed herein, and in particular to communicate with, monitor, and control devices of a pump station 100 as described herein.

Digital twin system 700 also includes a storage 706 that can include any combination of transitory and non-transitory computer-readable media, including but not limited to random-access memories (RAMS) or nonvolatile, hard-coded type mediums such as read only memories (ROMs) or erasable, electrically programmable read only memories (EEPROMs) or any other known storage or memory device.

This can include external devices such as magnetic tape storage, and user-recordable type mediums such as floppy disks, hard disk drives and compact disk read only memories (CD-ROMs) or digital versatile disks (DVDs), and other known optical, electrical, or magnetic storage devices. Storage 706 can also include Internet of Things (IoT) and Cloud storage services.

The storage 706 can include executable instructions 714 to perform any of the processes as described herein or to otherwise monitor and control devices of a pump station 100 as described herein. These instructions, when executed, cause the digital twin system to perform the processes or specific actions described herein. Storage 706 can also include pump data 716, which can include any data for the various pumps, such as specification data, current or historical operation data, predictive data, or other data for one or more of the pumps. Storage 706 can also include curves 718, which can include any of the manufacturer-specified or generated curves as discussed herein. Storage 706 can also include other data 712, which generally includes any other data useful for performing processes as described herein or otherwise monitor, communicate with, and control devices of a pump station 100 as described herein, including any sensor data. Storage 706 can also include pump models 720, which can be a digital twin model of any pump as discussed herein, including the first model and updated model.

Figure 8:
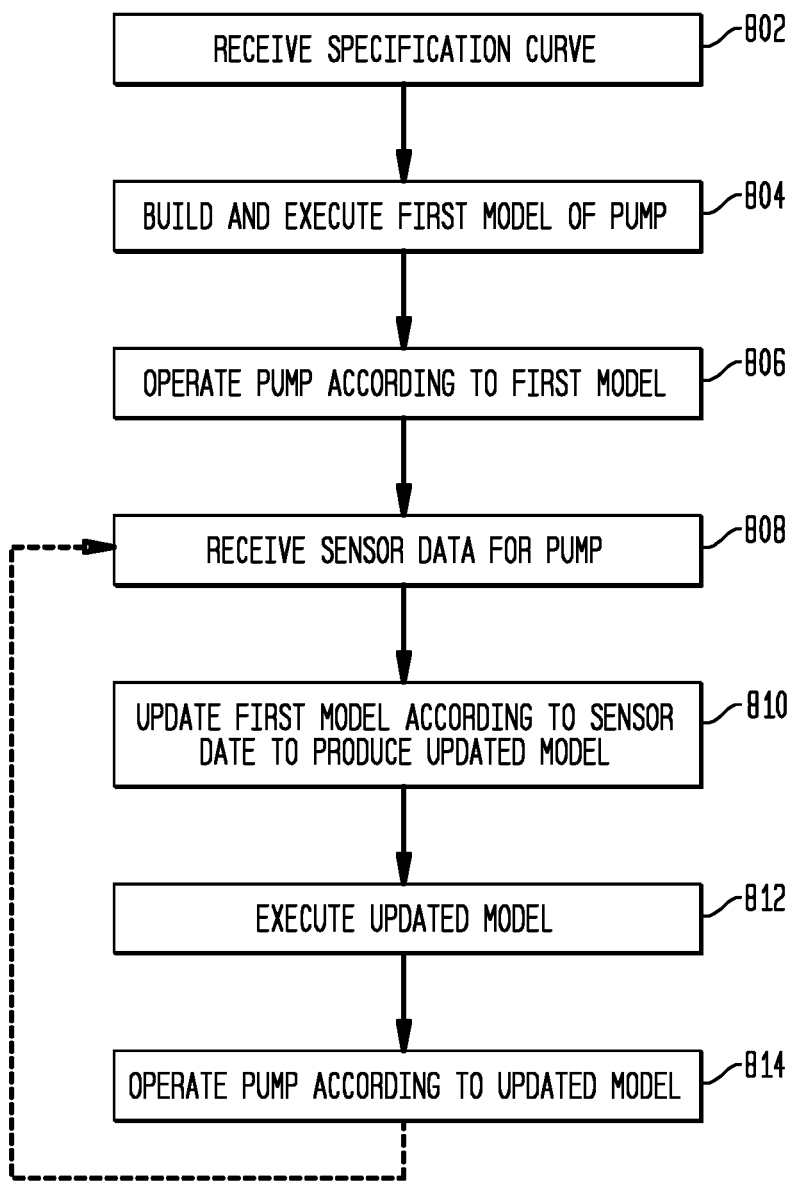
FIG. 8 illustrates a process in accordance with disclosed embodiments that can be performed by a digital twin system as disclosed herein.

FIG. 8 illustrates a process in accordance with disclosed embodiments that can be performed by a digital twin system as disclosed herein.

The system receives a specification curve for a pump (802). The specification curve can be performance curves as discussed above that are defined by a manufacturer of the pump, and can correspond to the "input curve" in the process of FIG. 4. The specification curve can be any other input curve corresponding to the expected or actual performance of the pump. The pump can be a centrifugal pump as described above. While this process is described in terms of a single specification curve, those of skill in the art will recognize that any number of specification curves can be similarly processed to create a more refined model of the pump.

The system builds and executes a first model of the pump based on the specification curve (804). This can be performed according to the process of FIG. 4, and can be built based on both the specification curve and any other curves processed as described herein.

The system operates the pump according to the first model (806).

The system receives sensor data for the pump as it operates (808). This can include any of the data from the pressure sensors, flow rate sensors, temperature sensors, density sensors, viscosity sensors, or other sensors discussed above or used in conjunction with the pump station. This can include initial sensor data, as when the process is executed for the first time, and any subsequent sensor data received in The system updates the first model according to the sensor data to produce an updated model (810). This can include adjusting any of the curves discussed above to match the actual sensor data that corresponds to the pump, so that the updated model accurately reflects the pump performance and accounts for any difference in performance, either instantaneously or over time, from the specification curves. The updated model can be stored as a "digital twin" of the pump as part of this step, and such an updated model can be continuously or repeatedly updated.

The system executes the updated model (812). The updated model acts as a digital twin to the pump in its current operating condition as opposed to its original manufacturer-specification condition.

The system operates the pump according to the updated model (814). This allows the system to operate both the pump (and other elements of the pump station) and the pump station as a whole most efficiently according to the actual operating condition of the pump as modeled by the updated model. For example, a four-pump station will operate at different times with only two pumps, only three, or all four. Disclosed embodiments improve operation of the pump station by selecting the pump trains that are most efficient for the operation. For example, if the station is running pumps 2 and 3, pump 3 is the least efficient, and pump 1 is the most efficient, the system will shut down pump 3 and start up pump 1.

The process can repeat, such as back to 808, to continually or repeatedly receive additional sensor data (808), update the model (810, where instead of updating the first model, the most recent updated model is further updated), execute the further-updated model (812), and operate the pump and pump station according to the further-updated model (814).

Figure 9:
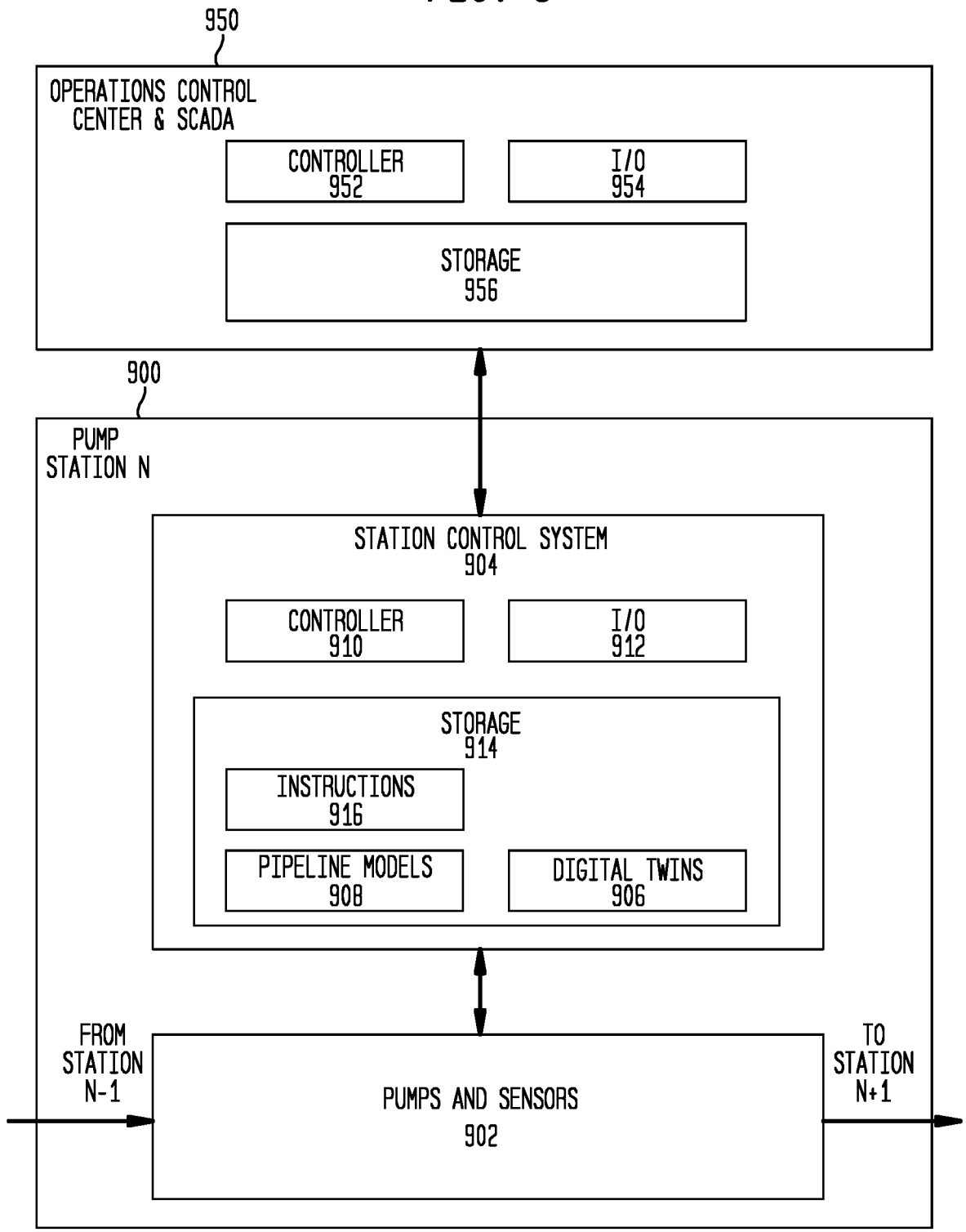
FIG. 9 illustrates a block diagram of a pump station and control system in accordance with disclosed embodiments.

FIG. 9 illustrates a block diagram of a pump station 900 and control system 904 in accordance with disclosed embodiments. The pump station itself, the pumps in the station, and the various sensors and other devices in the station can be as discussed above. In this figure, a plurality of pumps and sensors are generally represented as pumps and sensors 902, which analyze and pump liquids received in this station (station N) from upstream station N−1 to downstream station N+1. Note that any or all of the pump stations along a pipeline can be implemented as described herein.

Pumps and sensors 902 communicate with and can be controlled by station control system 904. The station control system 904 can include such elements as a controller 910, configured to perform processes as described herein, and I/O 912, which can include any necessary hardware to communicate with other devices, including physical connections, network interfaces (wired and/or wireless), display outputs, HMI inputs and outputs, and other devices, or appropriate connections to communicate with any such external devices to perform processes as disclosed herein, and in particular to communicate with, monitor, and control devices of a pump station 100 or 900 as described herein. Any or all of the pumping stations can include a station control system 904 as described herein.

Station control system 904 can also include a storage 914, that can include any combination of transitory and non-transitory computer-readable media, including but not limited to random-access memories (RAMS) or nonvolatile, hard-coded type mediums such as read only memories (ROMs) or erasable, electrically programmable read only memories (EEPROMs) or any other known storage or memory device. This can include external devices such as magnetic tape storage, and user-recordable type mediums such as floppy disks, hard disk drives and compact disk read only memories (CD-ROMs) or digital versatile disks (DVDs), and other known optical, electrical, or magnetic storage devices. Storage 506 can also include Internet of Things (IoT) and Cloud storage services.

The storage 914 can include executable instructions 916 to perform any of the processes as described herein or to otherwise monitor and control devices of a pump station 900 as described herein. These instructions, when executed, cause the pump station 900 and any of its elements to perform the processes or specific actions described herein, particularly under control of controller 910. Storage 914 can also include any of the data as discussed above with respect to the other figures and embodiments discussed herein. Storage 914 can also include digital twins 906 of the pumps in pump station 900 and pipeline models 908 of the pipelines used to transport the liquids being pumped by pump station 900.

Pump station 900, and in particular the station control system 904, is connected to communicate with operations control center and SCADA system 950 (or simply "control system 950"). Control system 950 can include controller 952, I/O 954, and storage 956, similar to those controller, I/O, and storage elements described above, and is configured to perform processes as described herein. Control system 950 can include any of the elements of station control system 904 to directly and remotely control or emulate the operations of the pump station 900.

Figure 10:
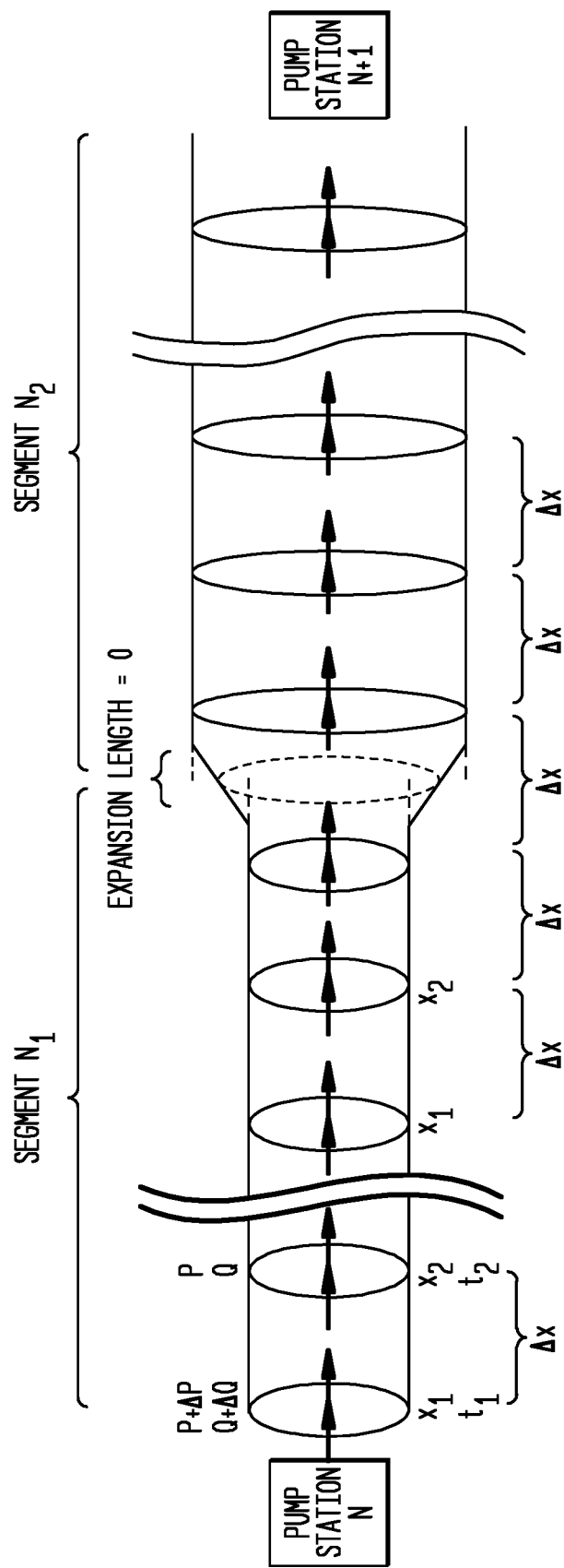
FIG. 10 illustrates an example a pipeline model of piping between pump stations in accordance with disclosed embodiments.

FIG. 10 illustrates an example a pipeline model of piping between pump stations in accordance with disclosed embodiments. A pipeline section $n_x$ is defined as the piping between pump stations, such as stations N to N+1. Each segment can be constructed with 1 to M segments of pipe. A pipe segment is defined as a length of pipe that has the same properties (diameter, smoothness, etc.) throughout its length. FIG. 10 illustrates a section of pipe consisting of two segments of pipe with unique properties. The number of segments (M) in a section are typically low (<=5). In some cases, a simplified pipeline model can be used in which expansion/reduction joints are defined to have zero length.

Each pipeline model 908 can be maintained as a pipeline steady-state and transient hydraulic model. Steady state models can be based on well-documented Bernoulli energy balance equations, while the transient hydraulic model can be based on last actual process data, last predicted process values, current process values, or one-dimensional pressure wave propagation via method of characteristics and pump digital twin outputs.

Station control system 904 can periodically, repeatedly, or continuously calculate the optimum (and safe) flow and discharge pressure based on the maximum allowable operating pressure and all available data and predicted pipeline pressure values. The station control system 904, using digital twins 906, pipeline models 908, and discharge pressure setpoints, can then predict the optimal station discharge pressure setpoint and the operation conditions of each of the pumps in the pump station and then control them accordingly.

Further, control system 950 can collect data from multiple pumps stations on the pipeline and either communicate that data to the respective station control systems 904 to optimize operations at each pumping station, or can transmit operation setpoints and other control data directly to each station control system 904. For example, control system 950 can periodically, repeatedly, or continuously calculate a suction-pressure-based discharge pressure reduction setpoint for each pumping station 900 and send these setpoints to each station control system 904.

Each pump control system 904 receives, from its various sensors, the actual liquid properties of the liquid being pumped, such as density, pressure, temperature, viscosity, and other characteristics, as well as the data such as flow rate and discharge and suction pressures. This data can, in some embodiments, then be transmitted from each pumping station to the control system 950. In disclosed embodiments, control systems 904 at pump stations N, N−1 and N+1 transmits the some or all of this data, optimized pump configurations and operational setpoints, and actual liquid properties to the "neighboring" pump stations N−1 and N+1, and could transmit any such data to control system 950 or any other pump station or processing system. The pump control systems 904 of the various pump stations can then use this data, in conjunction with their digital twin models of its actual pumps and the pipeline model of piping between pump stations, to predict the optimal operating parameters for the incoming liquid as it arrives via the pipeline from pump station N−1 to achieve the flow setpoint most efficiently.

In other embodiments, control system 950 can use this data in conjunction with the digital twin models of a given pumping station to control the pumps at that station as described herein.

Since the characteristics and nature of the liquid being transported changes, such a process allows pump station N to predict, for any given time after the liquid has been processed by an upstream pump, the characteristics of the liquid that will be arriving. These characteristics can be validated and adjusted, as necessary, according to the sensors of pump station N itself, and pump station N can then operate its pumps to pump the liquid according to the digital twin models and/or the pipeline model.

Figure 11:
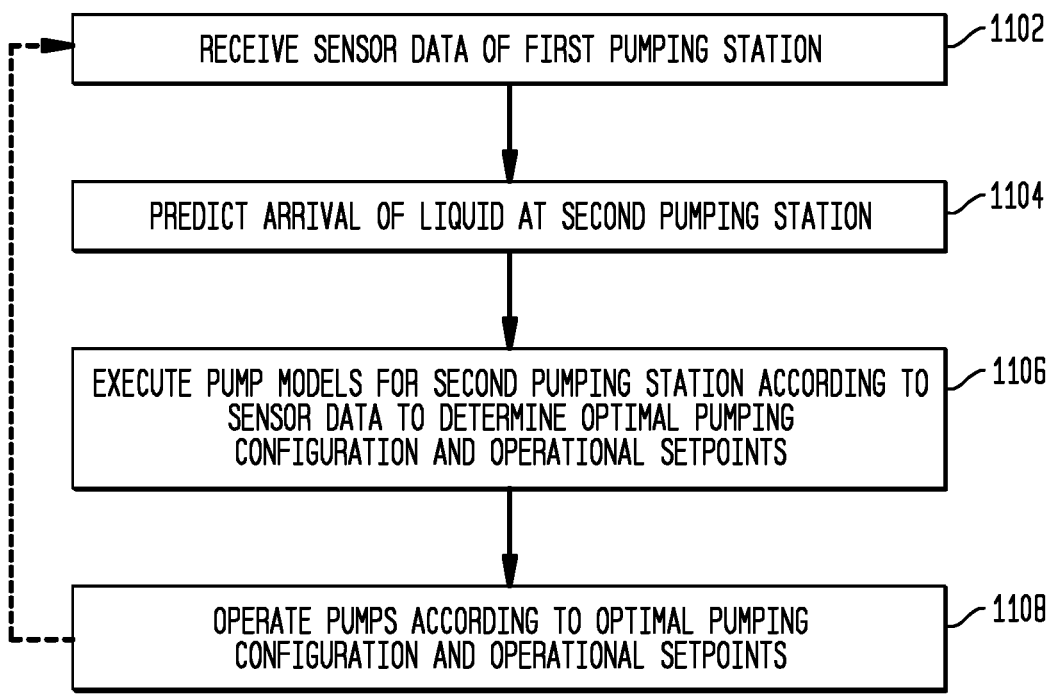
FIG. 11 illustrates a flowchart of a process in accordance with disclosed embodiments.

FIG. 11 illustrates a flowchart of a process in accordance with disclosed embodiments, for example as performed by one or more controllers of the current ("second") pumping station or in the control system, referred to generically as the "system" below.

The system receives sensor and/or setpoint data of a first pumping station corresponding to a liquid being transported from the first pumping station (upstream) to a second pumping station (1102). The sensor and setpoint data can include flow rate data, density data, viscosity data, pressure data, or other characteristics of the liquid being transported from the first pumping station to a second pumping station as determined by sensors as described herein. Note that since the characteristics of the liquid change over time, the sensor data can also be tagged with a timestamp of the data. Data can be received from multiple pumping stations.

The system predicts an arrival of the liquid at the second pumping station (1104). Of course, liquid is typically continuously being transported through the pipeline, and the liquid refers to the liquid to which the sensor data of the first pumping stations corresponds. As the process is repeated, on an occasional, periodic, or continual basis, new sensor data, corresponding to a new portion of the liquid, will be collected. The predicted arrival time and pressure can be based on one or more of the sensor data (such as flow rate or discharge pressure), the pipeline model, the timestamp, or other similar sensor data along the pipeline or at the second pumping station.

The system executes one or more pump models for the second pumping station using the sensor data to determine an optimal pumping configuration according to characteristics of the liquid (1106). The pump models can be "digital twin" models of the pumps of the second pumping station as described herein. The optimal pumping configuration can include operational setpoints.

The system operates one or more pumps of the second pumping station according to the optimal pumping configuration at the predicted arrival of the liquid at the second pumping station (1108). This operation can also be in accordance with the operational setpoints determined by executing the pump models. The optimal pumping configuration can be, for example, that configuration that uses the least energy to pump the liquid out of the second pumping station to a downstream pumping station at a given discharge pressure. The optimal pumping configuration can be a maximum steady state pressure and flow within the parameters of the pumps and allowable operating pressure limits.

The process of FIG. 11 can be performed repeatedly or continuously from 1102. For example, in some embodiments, such a process is performed often enough that the pumps of the second station are being operated according to the optimal pumping configuration for the liquid currently being pumped at the second pumping station even as other sensor data is being received for liquid currently being pumped at the first pumping station. In this way, the operations of the second pumping station can be constantly modified according to characteristics of the liquid arriving at the second pumping station.

Disclosed embodiments solve technical problems in existing systems. In existing systems, a pumping station is only able to react to the specific liquid being pumped as it is being processed by the particular pumping station, and can only use the "idea" manufacturer specifications of the pumps as a basis. As a result, the pumping station always operates under less-than-optimal conditions as it plays "catch up" to the characteristics of the liquid being processed and cannot properly adjust its own operations to its actual current pump operational characteristics.

Disclosed embodiments solve these problems by enabling the pumping station to predict the characteristics of incoming liquid and to adjust its own operation as the liquid arrives, doing so in accordance with accurate pump models. Using these techniques, the pipeline can operate at higher steady state pressures and flows because all the models and twins and the advanced controls have a much smaller overshoot that existing systems. Old systems with high overshoots in pressure have to operate at a lower steady-state pressure and flow because too high of a pressure overshoot will trip the safeties, shutting down the pipeline. Disclosed techniques minimize pressure overshoots, achieve the operating setpoint faster so the steady state operating pressure can be increased (within the maximum allowable operating pressure limit), and achieve high rates of flow.

Similar processes can be performed at each pumping station (or at the control system to control each pumping station), so that even as a given station is acting as the "second pumping station" for liquids currently being received from an upstream pumping station, it is also acting as the "first pumping station" for liquids currently being pumped to a downstream pumping station. The labels "first" and "second" are not intended to refer to specific locations of any pumping station along a pipeline.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all systems suitable for use with the present disclosure is not being depicted or described herein. Instead, only so much of a data processing system as is unique to the present disclosure or necessary for an understanding of the present disclosure is depicted and described. The remainder of the construction and operation of the systems and devices disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method, comprising:
receiving, by at least one controller, sensor data of a first pumping station corresponding to a liquid being transported from the first pumping station, wherein type and characteristics of the liquid being transported vary over time;
predicting arrival time of the liquid, by the at least one controller, at a second pumping station;
fluidly coupling the first pumping station to the second pumping station through a pipeline;
executing one or more pump models, by the at least one controller, according to the sensor data to determine an optimal pumping configuration; and
operating one more pumps of the second pumping station, by the at least one controller, according to the optimal pumping configuration, wherein the optimal pumping configuration is configured to predict optimal operating parameters for the one more pumps of the second pumping station at the predicted arrival time of the liquid to the second pumping station,
wherein the predicting of the arrival time of the liquid at the second pumping station is based at least on the sensor data, a timestamp of the sensor data and a model of the pipeline including a steady-state model and a transient hydraulic model of the pipeline.

2. The method of claim 1, wherein the at least one controller is a controller of a station control system of the second pumping station.

3. The method of claim 1, wherein the at least one controller is a controller of a control system that controls a plurality of pumping stations.

4. The method of claim 1, wherein the sensor data includes one or more of flow rate data, density data, viscosity data, or pressure data.

5. The method of claim 1, wherein each of the one or more pump models is a digital twin model of a corresponding pump of the second pumping station.

6. The method of claim 1, wherein the optimal pumping configuration is a configuration that uses the least energy to pump the liquid out of the second pumping station to a downstream pumping station at a given discharge pressure.

7. The method of claim 1, wherein the method is performed repeatedly or continuously.

8. An apparatus, comprising:
a memory, and
a controller in communication with the memory, the controller configured to:
receive sensor data of a first pumping station corresponding to a liquid being transported from the first pumping station, wherein type and characteristics of the liquid being transported vary over time;
predict arrival time of the liquid, by the at least one controller, at a second pumping station fluidly coupled to the first pumping station through a pipeline, wherein the predicted arrival time of the liquid at the second pumping station is based at least on the sensor data, a timestamp of the sensor data and a model of the pipeline including a steady-state model and a transient hydraulic model of the pipeline;
execute one or more pump models, by the at least one controller, according to the sensor data to determine an optimal pumping configuration; and
operate one more pumps of the second pumping station, by the at least one controller, according to the optimal pumping configuration, wherein the optimal pumping configuration is configured to predict optimal operating parameters for the one more pumps of the second pumping station at the predicted arrival time of the liquid to the second pumping station.

9. The apparatus of claim 8, wherein the apparatus is implemented in a station control system of the second pumping station.

10. The apparatus of claim 8, wherein the apparatus is implemented in a control system that controls a plurality of pumping stations.

11. The apparatus of claim 8, wherein the sensor data includes one or more of flow rate data, density data, viscosity data, or pressure data.

12. The apparatus of claim 8, wherein each of the one or more pump models is a digital twin model of a corresponding pump of the second pumping station.

13. The apparatus of claim 8, wherein the optimal pumping configuration is a configuration that uses the least energy to pump the liquid out of the second pumping station to a downstream pumping station at a given discharge pressure.

14. The apparatus of claim 8, wherein the controller is configured to perform the receiving, predicting, executing, and operating operations repeatedly or continuously.

* * * * *